(12) United States Patent
Nguyen

(10) Patent No.: US 6,687,066 B1
(45) Date of Patent: Feb. 3, 2004

(54) PARTITIONING DISC DRIVE READ/WRITE ELECTRONICS TO IMPROVE DATA TRANSFER PERFORMANCE

(75) Inventor: Hieu Van Nguyen, Oklahoma City, OK (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 09/510,442

(22) Filed: Feb. 21, 2000

Related U.S. Application Data

(60) Provisional application No. 60/121,168, filed on Feb. 22, 1999.

(51) Int. Cl.[7] .................................................. G11B 5/09
(52) U.S. Cl. ........................... 360/46; 360/65; 360/53
(58) Field of Search ...................... 360/29–40, 41–60, 360/65, 67, 68

(56) References Cited

U.S. PATENT DOCUMENTS

| | | | |
|---|---|---|---|
| 3,852,687 A | * 12/1974 | Hodges | ........................ 341/59 |
| 4,691,254 A | * 9/1987 | Cloke | ........................... 360/45 |
| 4,985,902 A | 1/1991 | Gurcan | |
| 5,027,369 A | 6/1991 | Kuenast | |
| 5,047,876 A | 9/1991 | Genheimer et al. | |
| 5,422,760 A | 6/1995 | Abbott et al. | |
| 5,430,661 A | 7/1995 | Fisher et al. | |
| 5,592,340 A | 1/1997 | Minuhin et al. | |
| 5,682,125 A | * 10/1997 | Minuhin et al. | ............... 333/18 |
| 5,705,868 A | 1/1998 | Cox et al. | |
| 6,128,160 A | * 10/2000 | Yamamoto | ............. 360/324.11 |
| 6,266,203 B1 | * 7/2001 | Street et al. | .................. 360/69 |
| 6,295,175 B1 | * 9/2001 | Tomita et al. | ................ 360/31 |

* cited by examiner

*Primary Examiner*—David Hudspeth
*Assistant Examiner*—Rocio Colon
(74) *Attorney, Agent, or Firm*—Fellers, Snider, et al.

(57) ABSTRACT

Apparatus in a disc drive for transferring data between a rotatable disc and a host computer. An analog pre-processor integrated circuit device incorporates circuitry to carry out analog processing functions including write current driving, readback signal amplification, prewrite compensation, frequency-domain filtering, and equalization. A digital post-processor integrated circuit device incorporates circuitry to carry out digital signal processing functions including Viterbi detection, decoding, error detection and correction, buffering, host interface functions, and data encoding and serialization. The analog pre-processor is preferably mounted within the interior environment of the disc drive to an actuator assembly that supports a head adjacent the disc. The digital post-processor is preferably supported on a printed circuit board mounted to an exterior surface of the disc drive.

11 Claims, 4 Drawing Sheets

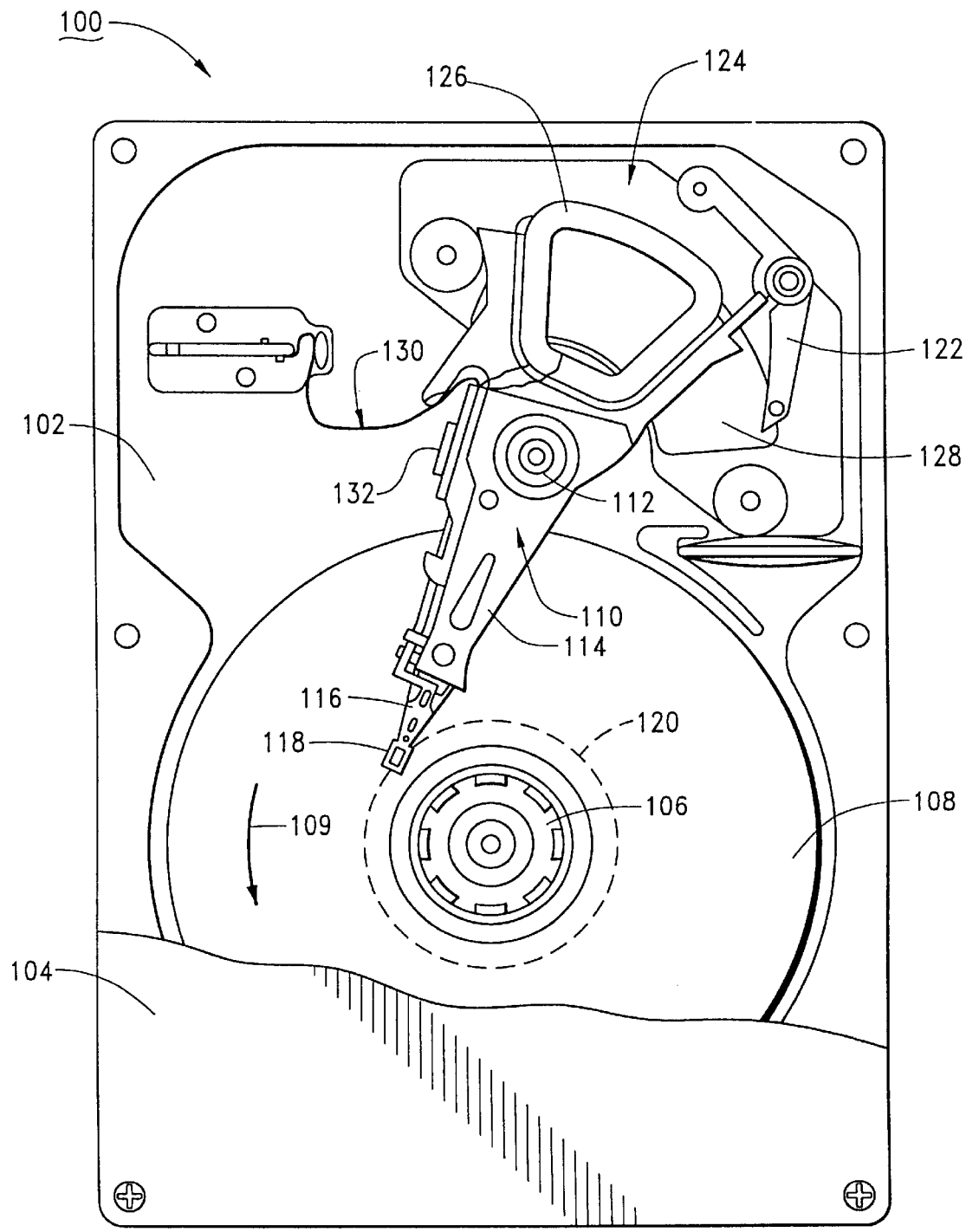
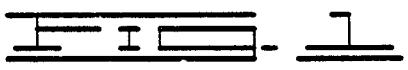

PARTITIONING DISC DRIVE READ/WRITE ELECTRONICS TO IMPROVE DATA TRANSFER PERFORMANCE

RELATED APPLICATIONS

This application claims priority to U.S. Provisional Application No. 60/121,168 filed Feb. 22, 1999.

FIELD OF THE INVENTION

This invention relates generally to the field of magnetic data storage devices, and more particularly, but not by way of limitation, to improving data transfer rate performance by partitioning disc drive read/write electronic circuitry.

BACKGROUND

Disc drives are used as primary data storage devices in modern computer systems and networks. A typical disc drive comprises one or more rigid magnetic storage discs which are journaled about a spindle motor for rotation at a constant high speed. An array of read/write transducing heads are provided to transfer data between tracks of the discs and a host computer in which the disc drive is mounted. The heads are mounted to a rotary actuator assembly and are controllably positioned adjacent the tracks by a closed loop servo system.

Continued demands for ever greater levels of data transfer performance at lower cost have led disc drive manufacturers to seek ways to enhance the functionality of the electronics used to control the reading and writing of data. Such enhancements have included, at the integrated circuit (IC) level, the use of successively smaller lithography (i.e., the individual size and spacing of the individual circuit elements, such as transistors) and using reduced source voltage levels.

While such efforts have been found to enhance the digital signal processing capabilities of the disc drive electronics, designers have been challenged to provide the corresponding requisite analog signal processing capabilities without significantly increasing system cost. What is needed is an improved approach to providing disc drive read/write electronics that allows designers to incorporate state of the art advancements in digital signal processing without being encumbered by limitations in effecting the requisite analog processing functionality.

SUMMARY OF THE INVENTION

The present invention provides an apparatus for improving disc drive data transfer performance. In accordance with preferred embodiments, a disc drive comprises a rotatable disc to which data are stored using a head that is controllably positioned using an actuator assembly.

Mounted to the actuator assembly is an analog pre-processor integrated circuit device that incorporates circuitry to carry out analog processing functions to read and write data. The pre-processor carries out write current driving, readback signal amplification, prewrite compensation, frequency-domain filtering, and equalization.

A digital post-processor integrated circuit device, preferably supported on a printed circuit board mounted to an exterior surface of the disc drive, incorporates circuitry to carry out digital signal processing functions. The post-processor carries out Viterbi detection, decoding, error detection and correction, buffering, host interface functions, and data encoding and serialization. Additional circuitry, such as a conventional programmable system processor and conventional motor driver circuitry, can be used to perform remaining servo positioning control functions.

In this way, lower cost, older technology fabrication techniques which accommodate larger lithography and higher operating voltages can be readily used to provide the analog features and performance necessary to match the higher performance, state-of-the art digital features incorporated into the post-processor. Tradeoffs between the analog and digital features of prior art designs, which typically use an analog preamplifier/driver, a mixed analog and digital read/write channel, and a digital interface, are eliminated. Instead, the traditional preamplifier/driver is further configured to carry out prewrite compensation, AGC, filtering and equalization tasks from the read/write channel. The post-processor forms a new digital channel/interface to handle all digital read/write processing as well as buffering and host interface tasks. Thus, the conventional three chip read/write system becomes an optimized, two chip processor, enhancing transfer performance at lower cost.

These and various other features and advantages which characterize the present invention will be apparent from a reading of the following detailed description and a review of the associated drawings.

BRIEF DESCRIPTION OF THE DRAWINGS

FIG. 1 is a top plan view of a disc drive including an analog pre-processor integrated circuit constructed in accordance with preferred embodiments of the present invention.

FIG. 6 is a side elevational generalized representation of the internal construction of the analog pre-processor integrated circuit.

DETAILED DESCRIPTION

Figure 2:
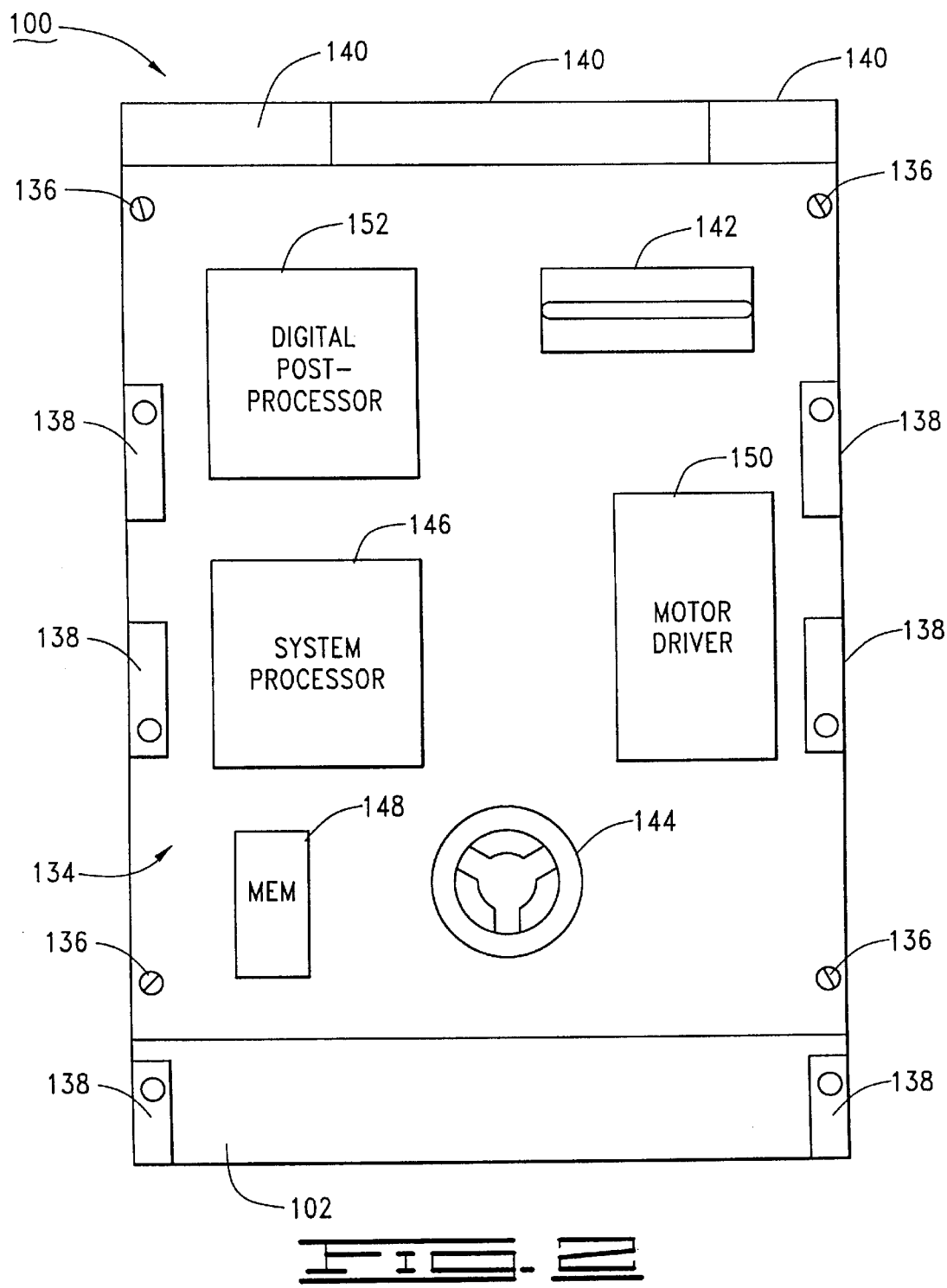
FIG. 2 is a bottom plan view of the disc drive of FIG. 1, illustrating a printed circuit board housing electronics used by the disc drive including a digital post-processor integrated circuit constructed in accordance with preferred embodiments of the present invention.

Referring to FIG. 1, shown therein is a top plan view of a disc drive 100 of the type used to interface with a host computer to magnetically store and retrieve user data. The disc drive 100 includes a base deck 102 to which various components of the disc drive 100 are mounted. A top cover 104 (shown in partial cutaway fashion) cooperates with the base deck 102 to form an internal, sealed environment for the disc drive.

A spindle motor 106 rotates a plurality of magnetic recording discs 108 at a constant high speed (in thousands of revolutions per minute) in an angular direction denoted by arrow 109. User data are written to and read from tracks (not designated) on the discs 108 through the use of an actuator assembly 110, which rotates about a bearing shaft assembly 112 adjacent the discs 108. The actuator assembly 110 includes a plurality of rigid actuator arms 114 which support flexible suspension assemblies 116 (flexures). A head 118 is supported at the end of each flexure 116, with the heads preferably having a magneto-resistive (MR) construction.

When the disc drive 100 is not in use, the heads 118 are parked on landing zones 120 and the actuator assembly 110 is secured using a magnetic latch assembly 122. A voice coil motor (VCM) 124 controls the position of the heads 118 through application of current to a coil 126 which interacts with a magnetic circuit which includes a permanent magnet 128. A flex assembly 130 facilitates electrical communication between the actuator assembly 110 and a disc drive printed circuit board (PCB) mounted to the underside of the base deck 102. The flex assembly 130 includes a novel analog pre-processor integrated circuit 132 (pre-processor) which incorporates circuitry used to interface with the heads 118 to read and write data in a manner to be discussed below.

FIG. 2 provides a bottom plan view of the disc drive of FIG. 1, showing in greater detail the aforementioned disc drive PCB, which has been numerically designated at 134. In a generally conventional fashion, the PCB 134 is mounted to the underside of the base deck 102 (FIG. 1) using suitable fasteners 136. Standoffs 138 adjacent the PCB 134 project from the base deck 102 to provide mounting surfaces and threaded holes at industry-standard locations to facilitate the mounting of the disc drive 100 in a user environment (such as within a host computer). It will be noted that the PCB 134 has been shown in FIG. 2 to have substantially the same width as the base deck 102, but is somewhat shorter in length than the base deck 102, as it is contemplated that the circuit integration carried out in accordance with the claimed invention advantageously reduces the size requirements for the PCB 134. The particular dimensions of the PCB 134 can be selected as desired for a given application, but the PCB 134 should desirably not extend beyond the length and width of the base deck to ensure the disc drive 100 fits within the defined industry-standard form factor and to prevent inadvertent damage to the PCB 134.

The PCB 134 includes a plurality of edge connectors 140 to effect the requisite power supply, interface and data connections with the host computer. A flex circuit connector 142 mates with a distal end of the flex assembly 130 shown in FIG. 1 to enable the transmission of electrical signals between the actuator assembly 110 and the remaining electronic components on the PCB 134. A spindle motor connector 144 as disclosed by U.S. Pat. No. 5,705,868 to Cox et al. preferably facilitates electrical connection with the spindle motor 106.

Four main integrated circuit devices are shown mounted to the PCB 134 in FIG. 2: a conventional programmable system processor 146 with associated memory 148, a conventional motor driver circuit 150, and a novel digital post-processor integrated circuit 152 (post-processor). It will be noted that the PCB 134 may be desirably provided with additional discrete circuits (resistors, capacitors, etc.), but such have been omitted for purposes of clarity.

Figure 3:
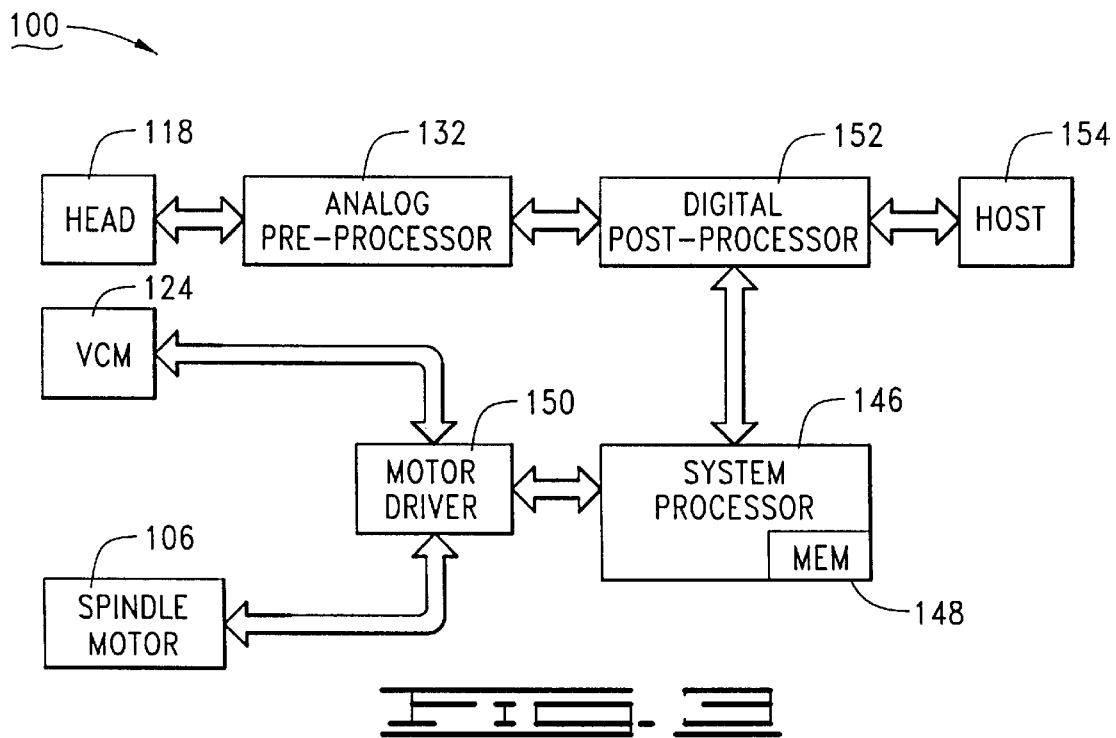
FIG. 3 is a functional block diagram of the disc drive of FIGS. 1 and 2 in conjunction with a host computer in which the disc drive can be mounted.

The manner in which the various circuit devices of the disc drive 100 illustrated in FIGS. 1 and 2 are functionally interconnected is set forth by FIG. 3. The system processor 146 provides top level control of the disc drive 100 in accordance with programming in the memory 148 and commands issued by the host computer (designated at 154). The motor driver circuit 150 applies currents to the VCM 124 and the spindle motor 106 in response to commands from the system processor 146. As desired, a second, intermediate servo processor (such as a digital signal processor, not shown) can be dedicated to provide servo control of the heads 118.

Figure 4:
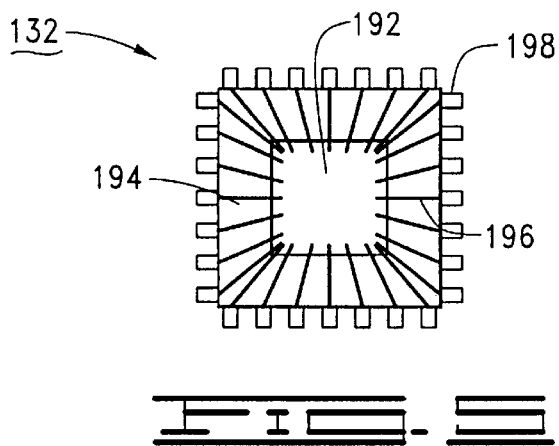
FIG. 4 is a functional block diagram showing the analog pre-processor integrated circuit and the digital post-processor integrated circuit in greater detail.

Significantly, a data transfer path between the heads 118 and the host computer 154 is established by a two-chip set consisting of the pre-processor 132 and the post-processor 152, shown more fully in FIG. 4. The pre-processor 132 and the post-processor 152 advantageously incorporate all preamplifier/driver, read/write channel, and host interface functions within the two respective ICs.

Generally, the pre-processor 132, affixed to the actuator assembly 110 as previously shown in FIG. 1, interfaces with the heads 118 and is configured to provide the analog signal data transfer functions necessary to read and write user data for the host computer 154. The post-processor 152, affixed to the PCB 134 as previously shown in FIG. 2, interfaces with the host computer 154 and is configured to provide the digital signal processing necessary to transfer the user data. Although the various circuits shown in FIG. 4 are otherwise conventional and well known to those skilled in the art, a brief review of these circuits will help set forth the novel aspects of the invention as embodied herein. For further details concerning these various components, see for example U.S. Pat. No. 5,422,760 issued to Abbott et al. and U.S. Pat. No. 5,592,340 issued to Minuhin et al.

The post-processor 152 comprises a buffer 156 which temporarily stores (buffers) user data as the user data are transferred (via the appropriate connector 140 and associated ribbon cable) between the disc drive 100 and the host computer 154. Overall control of the transfer are provided by a host interface 158, which sequences the passing of data in and out of the buffer and provides a communication path with the system processor 146 (FIG. 3).

User data to be written are provided by the host computer 154 to the buffer 156. The data are sequentially provided to an encoder 160 which applies run length limited (RLL) and error correction code (ECC) words to the user data to provide encoded data to a serializer 162, which serializes the data in a non-return-to-zero (NRZ) format. As will be recognized, the serialized analog data stream from the serializer is an analog, two state signal with varying distances between transitions corresponding to symbol lengths (such as 1T to 6T), with the transitions nominally defining the timing of magnetic flux transitions to be written to the disc 108.

The serialized, analog data stream is output by the post-processor and passed, via the flex connector 142 (FIG. 2) and the flex assemble 130 (FIG. 1) to the pre-processor 132 for receipt by a prewrite compensation circuit 164 which individually adjusts the timing of the transitions to compensate for various factors (including intersymbol interference) so that a readback signal generated from the flux transitions will have peaks at nominally the same times as the transitions in the serialized data stream. For additional details concerning prewrite compensation techniques, see U.S. Pat. No. 5,047,876 issued to Holsinger.

The compensated data stream is thereafter output by the prewrite compensation circuit 164 to a current driver circuit 166 which applies write currents to the associated head 118. Preferably, the head 118 has an anisotropic magneto-resistive (MR) construction with separate write and read elements 168, 170, with the write element 168 comprising a thin film inductive element and the read element 170 comprising a magneto-resistive element with a nominal electrical resistance that changes when exposed to a magnetic field of selected orientation.

To subsequently read the data from the associated disc 108, the read element 170 transduces the selected magnetization of the disc 108 to generate an analog readback signal which is preamplified by a preamplifier circuit 172. A closed loop automatic gain control circuit 174 (AGC) normalizes the amplitude of the amplified analog readback signal to a suitable range. An adaptive filter 176 applies frequency domain filtering to suppress low frequency noise and an analog equalizer 178 equalizes the filtered readback signal. The disc drive 100 preferably uses partial-response, maximum likelihood (PRML) signal detection and processing, so that the equalizer 178 is preferably characterized as a time-domain transversal equalizer which filters the input signals to a selected class of PRML signal processing, such as EPR-4. In alternative embodiments, the disc drive 100 can use other techniques, such as decision-feedback equalization (DFE) as discussed in U.S. Pat. No. 5,430,661 issued to Fisher et al.

The equalized signal output by the equalizer 178 is transmitted, via the aforedescribed flex connector 142 and the flex assembly 130 to the post-processor where a slicer circuit 180 digitizes the input signal to provide a sequence of samples to a Viterbi detector 182, which applies maximum likelihood detection to the sequence to reconstruct a representation of the encoded data stream formed by the encoder 160 during the write operation. A decoder 184 decodes the data (including translation of the RLL encoding) and an ECC circuit 186 applies on-the-fly error detection and correction to the decoded data. Verified correct data are thereafter transferred from the buffer 156 to the host computer 154.

Figure 5:
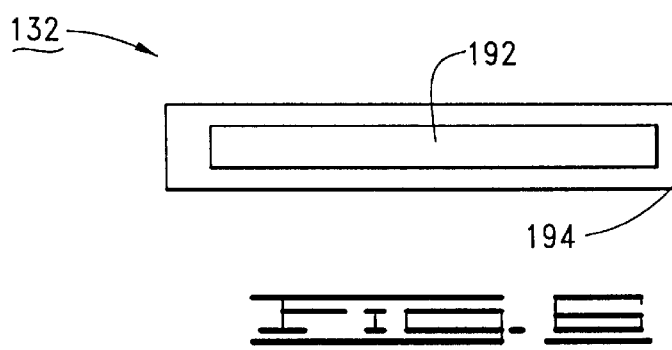
FIG. 5 is a top plan generalized representation of the internal construction of the analog pre-processor integrated circuit.
Figure 4:
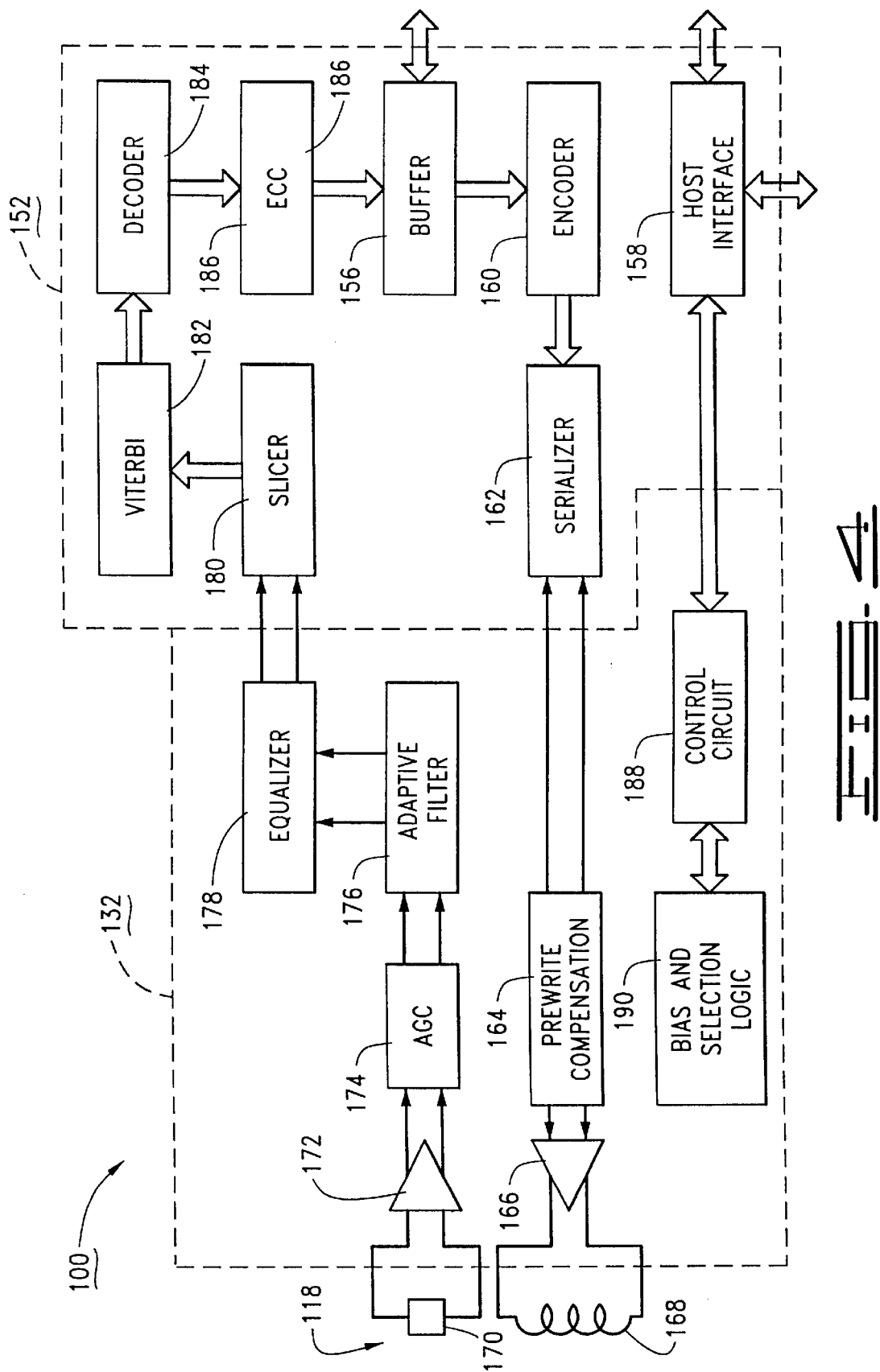

Finally, the pre-processor 132 is further provided with control circuitry 188 and read bias current and head selection logic 190 to provide the various head connection control as instructed by the host interface 158. Thus, the analog system functions and the digital system functions have been divided between the two separate ICs 132, 152, each of which is fabricated using suitable fabrication processes to optimize the respective performance of the devices. For reference, FIGS. 5 and 6 provide general representations of the pre-processor 132, which comprises a single integrated circuit die 192 which is encapsulated in a suitable encapsulating material 194 (such as plastic). Internal bond wires (one of which is shown at 196) provide the requisite connections to external pins (one of which is shown at 198). Corresponding pads are provided on the flex circuit of the flex assembly 130 (FIG. 1) to mate with the external pins 198. Although the post-processor 152 will have a single integrated circuit die formed using different fabrication processes, the overall construction will be similar (including the provision of corresponding pads on the PCB 134 to mate with the external pins).

It will be noted from the foregoing discussion that the analog system functions of prewrite compensation, write current driving, readback signal detection and preamplification, automatic gain control, filtering, and equalization have been placed on the same integrated circuit in proximity to the heads 118. In this way, lower cost, older technology fabrication techniques (accommodating larger lithography and higher operating voltages) can be readily used to provide the analog features and performance necessary to match the higher performance, state-of-the art digital features incorporated into the post-processor. Tradeoffs between the analog and digital features of present designs, which use an analog preamplifier/driver, a mixed analog and digital read/write channel, and a digital interface, are eliminated. Instead, the traditional preamplifier/driver is further configured to carry out prewrite compensation, AGC, filtering and equalization tasks from the read/write channel. A new digital channel/interface is formed which handles all digital read/write processing as well as buffering and host interface tasks. Thus, the conventional three chip read/write system becomes an optimized, two chip processor.

In this novel system architecture, it is important to carefully define the interfaces between the pre-processor 132 and the post-processor 152. Closed loop feedback of high frequency signals (clocks, data, etc.) should be avoided. Instead, timing control is preferably carried out asynchronously (by oversampling), or through the use of analog control voltages for the AGC 174. For write operations, data transfers between the pre-processor 132 and the post-processor 152 are in a serial format (minimizing pin count). The post-processor 152 preferably carries out demodulation of servo data which are transferred to the system processor 146 for servo positioning control.

In summary, the present invention is directed to an apparatus for improving disc drive data transfer performance. In accordance with preferred embodiments, an analog pre-processor integrated circuit device 132 (as an improved preamplifier/driver integrated circuit device used to electrically interface with a head 118 of a disc drive 100) comprises a write current driver circuit 166 to apply write currents to the head to write data in the form of a series of magnetic flux transitions to a recording disc 108; a readback signal amplification circuit 172 to apply preamplification to an analog readback signal having peaks corresponding to previously written magnetic flux transitions transduced from the disc; a prewrite compensation circuit 164, coupled to the write current driver circuit, which applies prewrite compensation to bits in an input write data stream to adjust timing of magnetic flux transitions written in response to the bits in the input write data stream so that peaks in a subsequent analog readback signal are provided with nominally a same temporal spacing as a temporal spacing of the bits in the input write data stream; an automatic gain control circuit 174, responsive to the readback signal amplification circuit, which normalizes the subsequent analog readback signal to a desired amplitude range; and an equalizer circuit 178, responsive to the automatic gain control circuit, which equalizes the normalized subsequent analog readback signal. The pre-processor 132 is preferably mounted to an actuator assembly 110 of the disc drive 100.

A digital post-processor integrated circuit device 152 is additionally provided which interfaces with the pre-processor 132 and configured to carry out digital signal processing functions. The post-processor 152 comprises a detector circuit 182, responsive to the equalizer circuit, which outputs a readback data stream having a series of bits nominally corresponding to the bits in the input data stream; an error correction code circuit 186, responsive to the equalizer circuit, which detects and corrects erroneous bits in the readback data stream; a buffer 156, responsive to the error correction code circuit, which temporarily stores the bits in the readback data stream; and a host interface 158, responsive to the buffer, operably configured to control transfer of the readback data stream in a host computer in which the disc drive is mountable. The post-processor 152 is preferably mounted to an external printed circuit board 134 of the disc drive 100.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a preamplifier/driver integrated circuit device of the type used to electrically interface with a head of a disc drive and comprising a write current driver circuit to apply write currents to the head to write data in the form of a series of magnetic flux transitions to a recording disc, and a readback signal amplification circuit to apply preamplification to an analog readback signal having peaks corresponding to previously written magnetic flux transitions transduced from the disc, the improvement characterized as an improved preamplifier/driver integrated circuit device further comprising:

- a prewrite compensation circuit, coupled to the write current driver circuit, which applies prewrite compensation to bits in an input write data stream to adjust timing of magnetic flux transitions written in response to the bits in the input write data stream so that peaks in a subsequent analog readback signal are provided with nominally a same temporal spacing as a temporal spacing of the bits in the input write data stream;
- an automatic gain control circuit, responsive to the readback signal amplification circuit, which normalizes the subsequent analog readback signal to a desired amplitude range; and
- an equalizer circuit, responsive to the automatic gain control circuit, which equalizes the normalized subsequent analog readback signal.

2. The improvement of claim 1, wherein the improved preamplifier/driver integrated circuit device further comprises an adaptive filter which applies frequency-domain filtering to the normalized subsequent analog readback signal to remove frequency components in a selected frequency range.

3. The improvement of claim 1, in combination with an actuator assembly which supports the head and which is operably configured to controllably move the head relative to the disc, wherein the improved preamplifier/driver integrated circuit device is mounted to the actuator assembly.

4. The improvement of claim 1, in combination with a digital integrated circuit device operably configured to interface with the improved preamplifier/driver integrated circuit device and comprising:

- a detector circuit, responsive to the equalizer circuit, which outputs a readback data stream having a series of bits nominally corresponding to the bits in the input data stream;
- an error correction code circuit, responsive to the equalizer circuit, which detects and corrects erroneous bits in the readback data stream;
- a buffer, responsive to the error correction code circuit, which temporarily stores the bits in the readback data stream; and
- a host interface, responsive to the buffer, operably configured to control transfer of the readback data stream in a host computer in which the disc drive is mountable.

5. The improvement of claim 4, wherein the equalizer comprises a transversal equalizer and wherein the detector comprises a Viterbi detector so that partial response maximum likelihood detection is applied to the normalized subsequent analog readback signal.

6. The improvement of claim 1, wherein the improved preamplifier/driver integrated circuit device is formed on a single integrated circuit die, and wherein the die is encapsulated in an encapsulating material.

7. The improvement of claim 4, wherein the digital integrated circuit device is formed on a single integrated circuit die, and wherein the die is encapsulated in an encapsulating material.

8. A disc drive, comprising:

- an actuator assembly which supports a head adjacent a rotatable disc;
- an analog pre-processor integrated circuit, mounted to the actuator assembly to electrically interface with the head, comprising:
  - a write current driver circuit to apply write currents to the head to write data in the form of a series of magnetic flux transitions to a recording disc;
  - a readback signal amplification circuit to apply preamplification to an analog readback signal having peaks corresponding to previously written magnetic flux transitions transduced from the disc;
  - a prewrite compensation circuit, coupled to the write current driver circuit, which applies prewrite compensation to bits in an input write data stream to adjust timing of magnetic flux transitions written in response to the bits in the input write data stream so that peaks in a subsequent analog readback signal are provided with nominally a same temporal spacing as a temporal spacing of the bits in the input write data stream;
  - an automatic gain control circuit, responsive to the readback signal amplification circuit, which normalizes the subsequent analog readback signal to a desired amplitude range; and
  - an equalizer circuit, responsive to the automatic gain control circuit, which equalizes the normalized subsequent analog readback signal; and
- a digital post-processor integrated circuit device, comprising:
  - a detector circuit, responsive to the equalizer circuit, which outputs a readback data stream having a series of bits nominally corresponding to the bits in the input data stream;
  - an error correction code circuit, responsive to the equalizer circuit, which detects and corrects erroneous bits in the readback data stream;
  - a buffer, responsive to the error correction code circuit, which temporarily stores the bits of the readback data stream as a set of output data; and
  - a host interface, responsive to the buffer, which controls transfer of the output data to a host computer in which the disc drive is mountable.

9. The disc drive of claim 8, wherein the buffer is further configured to temporarily store input data from the host computer, and wherein the digital post-processor integrated circuit device further comprises:

- an encoder circuit, responsive to the buffer, which encodes the input data with run length limited encoding; and
- a serializer, coupled between the encoder circuit and the prewrite compensation circuit, which serializes the encoded input data to form the input data stream supplied to the prewrite compensation circuit.

10. The disc drive of claim 8, further comprising:

- a base deck having an interior surface and an exterior surface, the interior surface supporting the actuator and the disc; and
- a printed circuit board affixed to the exterior surface of the base deck, wherein the digital post-processor is mounted to the printed circuit board.

11. A disc drive, comprising:

a head adjacent a rotatable disc; and means, coupled to the head, for establishing a data transfer path between the head and a host computer associated with the disc drive.

* * * * *